US009114761B2

(12) United States Patent
Schweindl et al.

(10) Patent No.: US 9,114,761 B2
(45) Date of Patent: Aug. 25, 2015

(54) INTERIOR LINING FOR A MOTOR VEHICLE, WHICH COMPRISES A ROOF LINER AND A STIFFENING FRAME, AND METHOD FOR THE PRODUCTION OF SAME

(71) Applicant: International Automotive Components Group, GmbH, Krefeld (DE)

(72) Inventors: Fritz Schweindl, Ebersberg (DE); Michael Behnke, Vaterstetten (DE)

(73) Assignee: International Automotive Components Group GmbH, Krefeld (DE)

( * ) Notice: Subject to any disclaimer, the term of this patent is extended or adjusted under 35 U.S.C. 154(b) by 0 days.

(21) Appl. No.: 13/901,235

(22) Filed: May 23, 2013

(65) Prior Publication Data
US 2013/0334843 A1 Dec. 19, 2013

(30) Foreign Application Priority Data
May 25, 2012 (DE) .......................... 10 2012 104 534

(51) Int. Cl.
*B60R 13/02* (2006.01)
(52) U.S. Cl.
CPC ......... *B60R 13/0231* (2013.01); *B60R 13/0225* (2013.01); *Y10T 29/49622* (2015.01)
(58) Field of Classification Search
CPC .... B60R 13/01; B60R 13/02; B60R 13/0212; B60R 13/0225; B60R 13/0231
USPC ............. 296/39.1, 39.3, 146.7, 214; 264/241, 264/248, 252, 257, 259, 319
See application file for complete search history.

(56) References Cited
U.S. PATENT DOCUMENTS

| 6,124,222 A | * | 9/2000 | Gebreselassie et al. ...... 442/389 |
| 7,147,276 B2 | * | 12/2006 | Pfeffer et al. ................. 296/214 |
| 7,237,834 B2 | | 7/2007 | Czinki et al. |

(Continued)

FOREIGN PATENT DOCUMENTS

| DE | 101 46 694 A1 | 4/2003 |
| DE | 600 03 661 T2 | 4/2004 |
| DE | 203 13 770 U1 | 2/2005 |

(Continued)

OTHER PUBLICATIONS
European Search Report of Sep. 12, 2013 issued in related European Application No. 13163875.1 (6 pgs).

*Primary Examiner* — Jason S Daniels
(74) *Attorney, Agent, or Firm* — Grossman, Tucker, Perreault & Pfleger, PLLC

(57) ABSTRACT

The invention relates to an interior lining for a motor vehicle, with a sliding or panoramic roof, which comprises a roof liner and a stiffening frame which is attached to the roof liner, and an opening in the roof liner, which delimits, frames and stabilizes the sliding or panoramic window. The roof liner is constructed in several layers, which comprise at least one core layer and one cover layer. The stiffening frame is produced from a fiber-reinforced composite material, which contains organic synthetic polymer fibers, carbon fibers or natural fibers, or mixtures of these fibers, and a binder made from a duroplastic or thermoplastic material. The surface weight and the bending stiffness of the stiffening frame are greater than those of the roof liner structure, preferably by at least 50%.

19 Claims, 2 Drawing Sheets

(56) References Cited

U.S. PATENT DOCUMENTS

Figure 1:
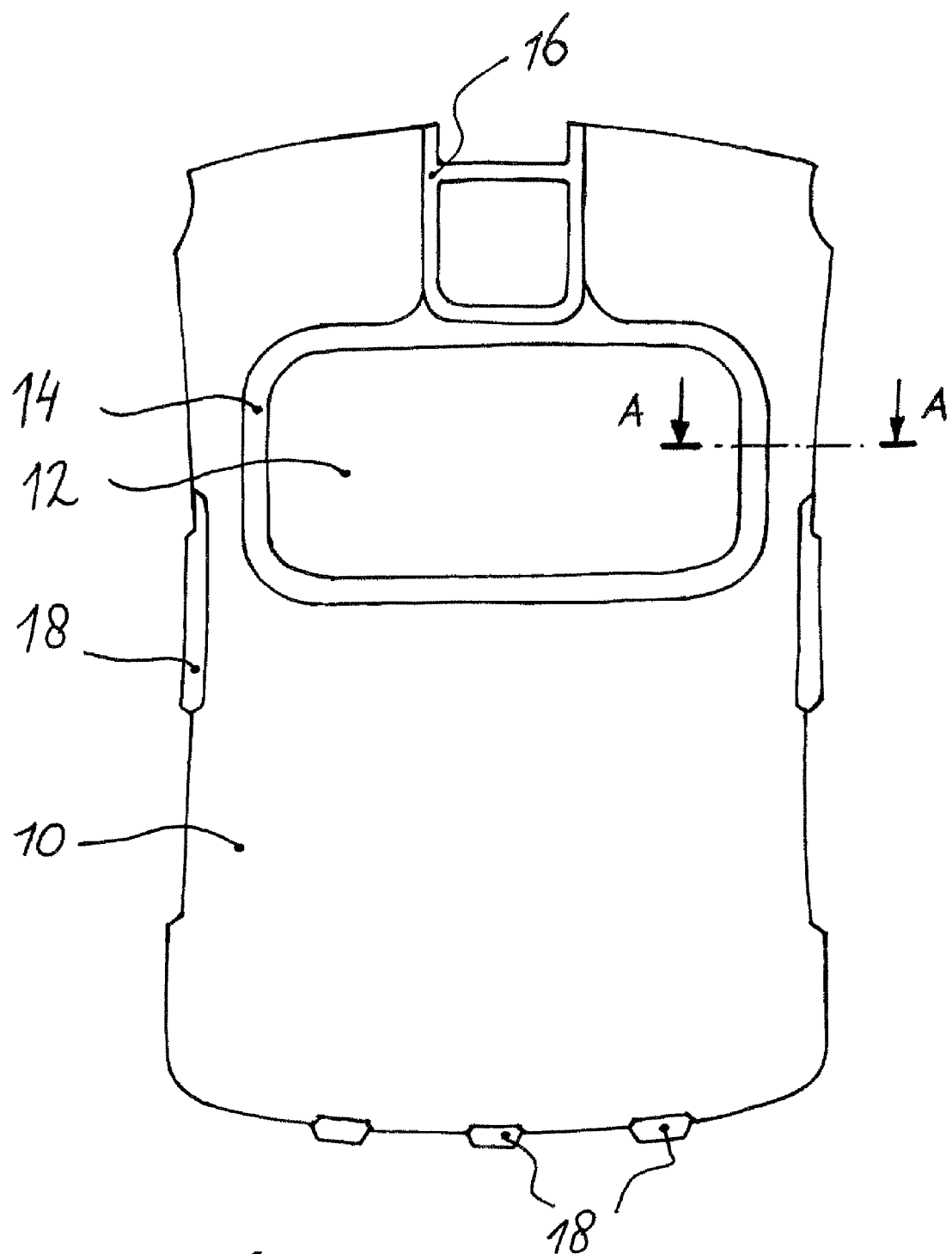

| | | | |
|---|---|---|---|
| 7,942,475 B2* | 5/2011 | Murray | 296/216.07 |
| 8,043,542 B2* | 10/2011 | Pfeiffer et al. | 264/248 |
| 8,235,444 B2 | 8/2012 | Eidt et al. | |
| 2003/0141005 A1 | 7/2003 | Donatti et al. | |
| 2008/0258507 A1 | 10/2008 | Dykman et al. | |

FOREIGN PATENT DOCUMENTS

| | | |
|---|---|---|
| DE | 10 2005 008 678 A1 | 8/2006 |
| DE | 10 2007 041221 B3 | 1/2009 |
| DE | 20 2010 006 678 U1 | 12/2010 |
| EP | 1 319 554 A1 | 6/2003 |
| EP | 1 914 097 A2 | 4/2008 |

* cited by examiner

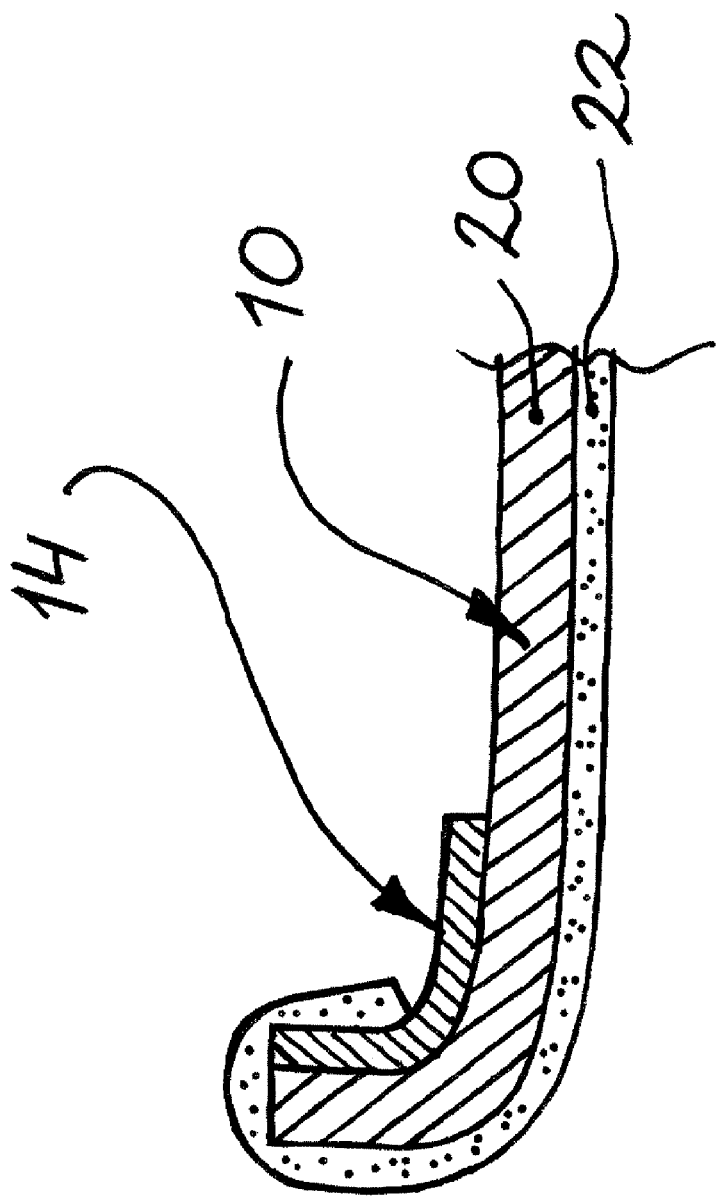

INTERIOR LINING FOR A MOTOR VEHICLE, WHICH COMPRISES A ROOF LINER AND A STIFFENING FRAME, AND METHOD FOR THE PRODUCTION OF SAME

The invention relates to an interior lining for a motor vehicle with a sliding or panoramic roof, which comprises a roof liner or a stiffening frame. The stiffening frame is attached to the roof liner, in order to frame and stabilize an opening in the roof liner, which is used to receive the sliding or panoramic window. The roof liner is constructed in several layers, which comprise at least one core layer and one cover layer, as a so-called light-weight construction roof liner. Such light-weight construction roof liners have a low surface weight on the order of magnitude of 500-1000 g/m$^2$, for example, and they do not have sufficient stiffness to frame a sliding or panoramic window in a stable manner. Therefore, it is known in principle how to stabilize roof liners, which receive a sliding or panoramic window, with a stiffening frame.

DE 203 13 770 U1 describes a roof liner for a motor vehicle, which comprises a relatively dimensionally stable core layer, and a decorative layer which faces the vehicle interior and which comprises an opening for receiving a sliding roof. Along the margin of the opening, a stiffening profile extends, wherein the core layer and the decorative layer are bent to form the margin, and the stiffening profile is embedded into the bent margin. The stiffening profile is made of plastic or metal.

U.S. Pat. No. 7,942,475 B2 describes a stiffening frame for the roof opening over a motor vehicle, which is made of a composite material, such as a glass fiber-containing polyurethane. The stiffening frames is connected directly to the metal plate of the roof liner, in order to reinforce the roof opening which is used to receive the sliding roof. The composite material is used in particular for weight reduction.

The disadvantage of the two solutions of the prior art is the use of materials having different thermal and chemical properties, for example, different expansion coefficients and chemical compositions. This entails the risk of the connection between the stiffening frame and the roof liner or the car body becoming loose and/or the risk of a permanent deformation of the roof liner occurring. Moreover, the prior art requires a relatively complicated connection technique and it makes recycling difficult.

The problem of the invention is to indicate an interior lining for a motor vehicle, particularly a roof liner, and a method for the production of same, wherein the roof liner comprises an opening for receiving a sliding or panoramic window, which is framed and stabilized by a stiffening frame, wherein the interior lining should have a low weight and be nonetheless dimensionally stable.

This problem is solved with an interior lining according to claim 1 and a method according to claim 17. Preferred embodiments of the invention are indicated in the dependent claims.

The invention proposes an interior lining for a motor vehicle with a sliding or panoramic roof, which comprises a roof liner and a stiffening frame which is attached to the roof liner, and an opening in the roof liner, which delimits, frames, and stabilizes the sliding or panoramic window. The roof liner is constructed in several layers which comprise at least one core layer and one cover layer. The stiffening frame is produced from a fiber-reinforced composite material, which contains synthetic polymer fibers, carbon fibers or natural fibers, or mixtures of these fibers, and a binder made from a duroplastic or thermoplastic material. The surface weight and the bending stiffness of the stiffening frame are greater than those of the roof liner structure, preferably by at least 50%. Thus, the invention provides a roof liner including its stiffening, which can be produced completely on the basis of light-weight construction materials, such as foam materials and fiber materials. Moreover, it is possible to produce the interior lining on the basis of light-weight, renewable materials, such as natural fibers. The materials of the roof liner and of the stiffening frame can be adapted to each other, in such a manner that their chemical and physical properties are compatible, and no problems arise, for example, owing to different thermal expansion coefficients. In comparison to the use of metal or plastic frames, made from extruded profiles, for example, a considerable saving in weight can be achieved. In an embodiment of the invention, the stiffening frame is produced by molding the fiber-reinforced composite material in the form of a compact component. It can be composed of several frame pieces, which are melted together during the molding. This has the advantage that the stiffening frame can be produced by simply blank cutting fiber mattes, largely without waste. The material consumption is minimized consequently, wherein a stiffening frame which has a high structural stability and intrinsic stiffness is obtained anyhow due to the crimping of the individual frame pieces. To increase the stiffness of the frame, the latter can be formed by profiles, for example, U-shaped profiles.

In an embodiment of the invention, the stiffening frame is composed of four frame pieces, which form the four sides of the frame and which are melted together at the corners of the stiffening frame. For this purpose, the marginal pieces of the stiffening frame are simply positioned in a pressing tool in such a manner that they overlap at the corners of the stiffening frame. They are then melted together during the pressing.

In an embodiment of the invention, the roof liner, as mentioned above, is a light-weight construction roof liner. For example, it can have a surface weight on the order of 500-1000 g/m$^2$ or less. The stiffening frame can have a surface weight of approximately 800-1800 g/m$^2$.

In an embodiment of the invention, the stiffening frame is produced from a composite material which contains carbon fibers, and epoxide resin as binder. Using these materials, a particularly stable and light-weight construction is obtained.

In another embodiment, the stiffening frame is produced from a composite material which contains natural fibers and acrylate as binder. These materials are advantageous in that natural fibers, as a renewable raw material, and acrylate are commonly available and cost effective. The treatment and processing of the materials is not complicated. Nevertheless, this special combination of materials in particular achieves an exceptionally stable stiffening frame.

The composite material of the stiffening frame can have a mixing ratio of fibers to binders from approximately 60:40 to approximately 80:20, and particularly from approximately 70:30 to 80:20.

The composite material of the stiffening frame can include, in different embodiments of the invention, the following combination of materials: a natural fiber matte, made in particular from hemp, kenaf, flax, sisal, jute, wood or mixtures thereof, and a duroplastic or thermoplastic binder. The duroplastic binder can be, for example, epoxide, acrylate, phenol, polyurethane or unsaturated polyesters, and it can be applied or introduced in liquid or powder form onto and/or into the fiber matte. The thermoplastic binder can be, in particular, a biopolymer, such as PLA, polyester, polyolefin (PP, PE) or PA, which is introduced in the form of thermoplastic binder fibers into the fiber matte. In another embodiment, the composite material of the stiffening frame can comprise polymer fibers made from organic, synthetic polymer fibers, in particular from polyester, carbon, aramid or Kevlar, and a duroplastic binder. The duroplastic binder is a resin, for example, which is applied or introduced in liquid or powder form onto and/or into the polymer fiber material. The above-mentioned combination of materials was found to be particularly advantageous, with a view to achieving a good compromise between the requirements of high stiffness, good possibility, and low heat expansion coefficients, with a very low component weight.

The stiffening frame according to the invention can comprise, in addition, inserts made of metal or the same composite material, for example. On the stiffening frame, it is also possible to form attached parts, such as fastening elements, additional stiffening frames, and support structures. It is also possible to integrate handholds, consoles, light-weight elements, airbag components, or to mount them on the stiffening frames. Corresponding connection pieces can be inserted into the tool and molded immediately during the molding of the stiffening frame. The stiffening frame can also be broadened in order to stiffen additional recesses in the roof liner, for example, cutouts for lighting, or to be used as a seat for attached parts, for example, consoles.

The stiffening frame can be molded or glued on the roof liner. In an embodiment of the invention, the stiffening frame and the roof liner are produced from the same materials.

The invention also provides a method for producing an interior lining of the above described type, with the following process steps: blank cutting of a composite material matte in order to form frame pieces which form portions of the frame, wherein the binder is introduced before or after the blank cutting into the composite material matte; inserting the frame pieces in a pressing tool, so that the frame pieces overlap; molding the frame pieces in order to shape the stiffening frame to a predetermined shape and to connect the frame pieces to each other; and connecting the stiffening frame to the roof liner. In an embodiment, four frame pieces are provided, which form the four sides of the frame and which overlap at the corners of the stiffening frame. Depending on the surface weight and the desired compaction degree prior to the deformation, the thickness of the composite material matte can be between 1 and 5 mm, for example. It also depends on the absolute dimensions of the frame, the geometry, the size of the recess, and the stiffness requirements. The connection of the individual frame pieces is carried out via a matrix composite after the melting and subsequent hardening or the polymerization of the binder. In the process, they are melted together and as a result "agglutinated."

The composite material matte can already contain a binder proportion, or the binder is applied during the manufacturing process, for example, by spraying or immersion in a bath. The blank cutting of the composite material matte can be carried out, for example, by punching, wherein it is also possible to carry out a subsequent cutting after the shaping of the stiffening frame, for example, by punching or water jet cutting.

In the method according to the invention, heat can be added to the work piece before and/or during the molding. The heating of the composite matte can occur, for example, by contact heating, an IR radiation device, environmental air, or in another manner.

The stiffening frame can be attached to the already formed roof liner by means of an adhesive, or during the processes of molding the roof liner, as an insert. In the process, it is possible to produce the stiffening frame first separately, and then attach it by molding to the roof lines. It is also conceivable to insert only the frame pieces of the stiffening frame together with the roof liner blank into a pressing tool, and at the same time to shape the roof liner to a predetermined shape, and to press the frame pieces and melt them to each other, so that the stiffening frame is produced and at the same time molded on the roof liner.

As explained above, the stiffening frame can be enlarged in order to stiffen additional recesses on the roof liner or to be used as a recess for attached parts. For this purpose, it is possible, for example, to insert additional patrolling of the composite material in the shaping tool, and attach them at the same time by molding.

The invention is explained in greater detail below using an embodiment example in reference to the figures.

FIG. 1 shows a top view of an interior lining for a motor vehicle with a roof liner and with a stiffening frame; and FIG. 2 shows a cross-sectional representation through a portion of the roof liner with the stiffening frame of FIG. 1 along line A-A.

FIG. 1 shows a roof liner 10 for a motor vehicle with an opening 12 which, in the installed in state of the roof liner, delimits a sliding or panoramic window. The opening 12 is framed and stabilized by a stiffening frame 14. On the stiffening frame 14, an additional stiffening frame 16 for a front console is attached by molding. FIG. 1 shows, in addition, attachment elements 18 for the attachment of the roof liner 10 to the inner side of a vehicle roof.

The construction of the vehicle roof 10 and of the stiffening frame 14 is shown in further detail in the cross-sectional representation of FIG. 2. The roof liner 10 is constructed as a sandwich with a core layer 20 and a cover or decorative layer 22. The core layer 20 can be a foam layer, for example, a PU foam layer, and the cover layer 22 can be a textile layer or another fiber-reinforced cover layer. It is preferable to use a cover layer that has been reinforced with natural fiber.

The roof liner 10 is bent upward at its margin, at the opening 12, and reinforced by the stiffening frame 14. In the depicted embodiment example, the cover layer 22 is positioned around the margin of the core layer 10 and of the stiffening frame 14, in order to form a clean termination. The stiffening frame 14 follows the contour of the roof liner 10 and it has a U- or L-shaped profile, for example. It is applied flat against the roof liner 10. Additional profiling can be provided for stiffening the stiffening frame.

With regard to the materials for the stiffening frame 14, its manufacture as well as its connection to the roof liner 10, reference is made to the above description.

LIST OF REFERENCE NUMERALS

10 Roof liner
12 Opening
14 Stiffening frame
16 Stiffening frame
18 Fastening elements
20 Core layer
22 Cover or decorative layer

What is claimed is:

1. An interior lining for a motor vehicle with a sliding or panoramic roof, comprising:
 a roof liner and a first stiffening frame which is attached to the roof liner, and an opening in the roof liner, which delimits, frames and stabilizes the sliding or panoramic window,
 wherein the roof liner has a weight of 500-1,000 $g/m^2$ and is constructed in several layers, which comprise at least one core layer and one cover layer, and wherein the first stiffening frame has a weight of 800-1,800 g/m² and is produced from a fiber-reinforced composite material which contains natural fibers, and a binder of acrylate, and a second stiffening frame attached to the roof liner, the second stiffening frame connected to the first stiffening frame, and the second stiffening frame for a front console, and wherein a surface weight and a bending stiffness of the first stiffening frame are greater than those of the roof liner structure.

2. Interior lining according to claim 1, wherein the first stiffening frame is produced by molding the fiber-reinforced composite material in the form of a compact component.

3. Interior lining according to claim 2, wherein the first stiffening frame is composed of several frame pieces which are melted together during the molding.

4. Interior lining according to claim 3, wherein the first stiffening frame is composed of four frame pieces, which form the four sides of the frame and which are melted together at the corners of the first stiffening frame.

5. Interior lining according to claim 1, wherein the core layer of the roof liner is produced from a duroplastic or thermoplastic material, in particular in the form of a foam layer, more specifically a PU foam layer, and a fiber-reinforced cover layer, in particular a cover layer that has been reinforced with natural fiber, is applied onto one or both sides of the core layer.

6. Interior lining according to claim 1, wherein the roof liner is a light-weight construction roof liner with a surface weight on the order of magnitude of 500-700 g/m², and the first stiffening frame has a surface weight that is at least twice as large.

7. Interior lining according to claim 1, wherein the fiber-reinforced composite material contains carbon fibers.

8. Interior lining according to claim 1, wherein the fiber-reinforced composite material has a mixing ratio of fibers to binder from approximately 60:40 to approximately 80:20.

9. Interior lining according to claim 1, wherein
the natural fibers are in a form of a natural fiber matte, made from hemp, kenaf, flax, sisal, jute, wood or mixtures thereof, and
the acrylate binder is applied or introduced in liquid form or powder form onto and/or into the fiber matte.

10. Interior lining according to claim 1, wherein the fiber-reinforced composite material contains
at least one of synthetic polymer fibers and carbon fibers, wherein the synthetic polymer fibers are at least one of polyester fibers and aramid fibers.

11. Interior lining according to claim 1, wherein the first stiffening frame comprises inserts, made from the same fiber-reinforced composite material.

12. Interior lining according to claim 1, wherein fastening elements are molded on the first stiffening frame.

13. Interior lining according to claim 1, wherein the first stiffening frame is molded or glued on the roof liner.

14. Interior lining according to claim 1, wherein the first stiffening frame and the roof liner are produced from the same materials.

15. A method for producing an interior lining for a motor vehicle with a sliding or panoramic roof, comprising:

forming a roof liner, wherein the roof liner includes an opening which delimits, frames and stabilizes a sliding or panoramic window, the roof liner having the weight of 500-1,000 g/m² and constructed in several layers, which comprise at least one core layer and one cover layer, blank cutting a composite material matte for the formation of frame pieces which form portions of a stiffening frame, wherein the composite material matte contains natural fibers and an acrylate binder, wherein the binder is introduced before or after the blank cutting into the composite material matte, inserting the frame pieces into a pressing tool, so that the frame pieces overlap, molding the frame pieces such that the stiffening frame is formed with a predetermined shape and the frame pieces are melted together, and connecting the stiffening frame to the roof liner, wherein a surface weight and a bending stiffness of the stiffening frame are greater than those of the roof liner, and the stiffening frame has a weight of 800-1,800 g/m².

16. Method according to claim 15, wherein heat is added to the frame pieces before and/or during the molding.

17. Method according to claim 15, wherein the shaped first stiffening frame and a roof liner blank are introduced into a second pressing tool, and the roof liner is shaped to a predetermined shape by molding, wherein, during the pressing process, by which the roof liner is shaped, the stiffening frame is molded on the roof liner.

18. Method according to claim 15, wherein the frame pieces of the stiffening frame are introduced together with a roof liner blank into the pressing tool, and the roof liner is shaped to a predetermined shape by molding, wherein, during the pressing process, by which the roof liner is formed, the frame pieces are melted together, and the stiffening frame is molded on the roof liner.

19. An interior lining for a motor vehicle with a sliding or panoramic roof, comprising:
a roof liner and a first stiffening frame which is attached to the roof liner, and an opening in the roof liner, which delimits, frames and stabilizes the sliding or panoramic window, wherein the roof liner has a weight of 500-1,000 g/m² and is constructed in several layers, which comprise at least one core layer and one cover layer, and wherein the stiffening frame has a weight of 800-1,800 g/m² and is produced from a fiber-reinforced composite material which contains natural fibers, and a binder of acrylate, and wherein a surface weight and a bending stiffness of the first stiffening frame are greater than those of the roof liner structure, and wherein the roof liner and the stiffening frame exhibit compatible thermal expansion coefficients such that roof liner and stiffening frame do not undergo permanent deformation.

* * * * *